United States Patent [19]
Schreiber et al.

[11] Patent Number: 4,655,103
[45] Date of Patent: Apr. 7, 1987

[54] CLUTCH FOR POWER SCREWDRIVERS

[75] Inventors: Wolfgang Schreiber; Manfred Ludwig, both of Stuttgart; Ewald Hald, Filderstadt, all of Fed. Rep. of Germany

[73] Assignee: C. &. E. Fein GmbH & Co., Stuttgart, Fed. Rep. of Germany

[21] Appl. No.: 818,220

[22] Filed: Jan. 13, 1986

[30] Foreign Application Priority Data

Mar. 23, 1985 [DE] Fed. Rep. of Germany ....... 3510605

[51] Int. Cl.⁴ ........................................ B25B 23/157
[52] U.S. Cl. ....................................... 81/474; 81/467; 81/473; 192/56 R; 192/150; 173/12
[58] Field of Search .................... 81/473–476, 81/467; 192/56 R, 150, 56 C; 173/12

[56] References Cited

U.S. PATENT DOCUMENTS

| 2,927,672 | 3/1960 | Banner | 81/474 |
| 2,968,979 | 1/1961 | Aijala | 81/474 |
| 3,807,539 | 4/1974 | Reed | 192/150 |
| 4,606,443 | 8/1986 | Kimura | 192/150 |

Primary Examiner—Frederick R. Schmidt
Assistant Examiner—Bradley I. Vaught
Attorney, Agent, or Firm—Max Fogiel

[57] ABSTRACT

A clutch for power screwdrivers. It has a transmission, an adjustable bit stop, and a drive shaft. It also has a cogwheel with cams on one face and a clutch disk with catches on one face mounted on the drive shaft. The object is a low-noise, wear-resistant clutch. The drive shaft is in one piece. An intermediate disk with catches on one face and cams on the other face is positioned between the cogwheel and the clutch disk. A spring mechanism is positioned between the cogwheel and the intermediate disk.

5 Claims, 5 Drawing Figures

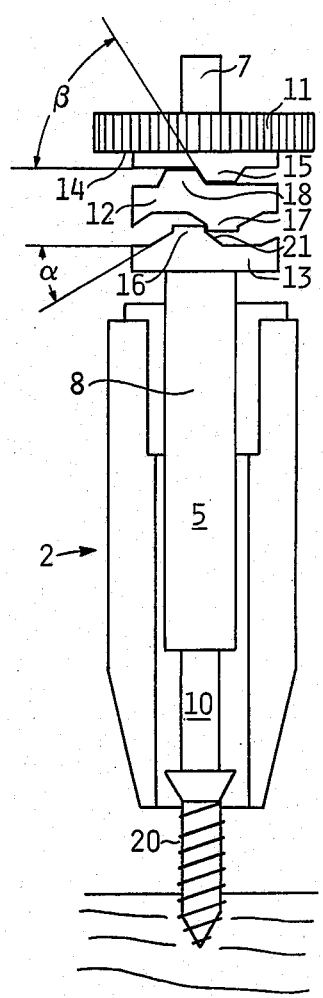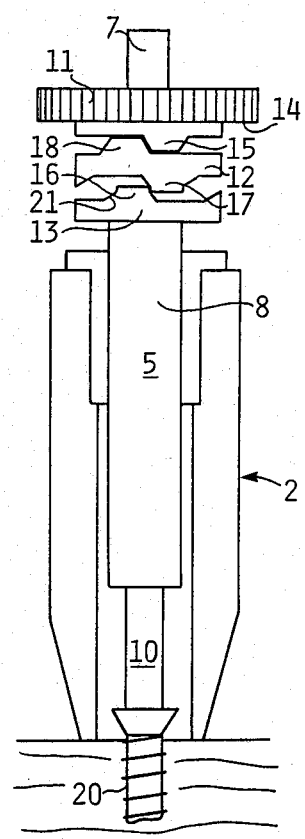
FIG. 2a  FIG. 2b

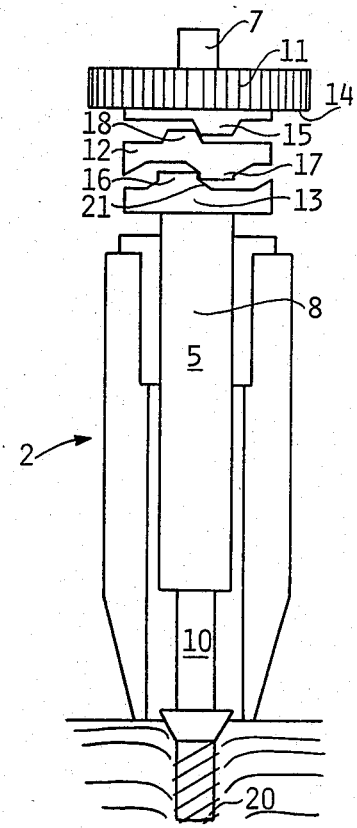
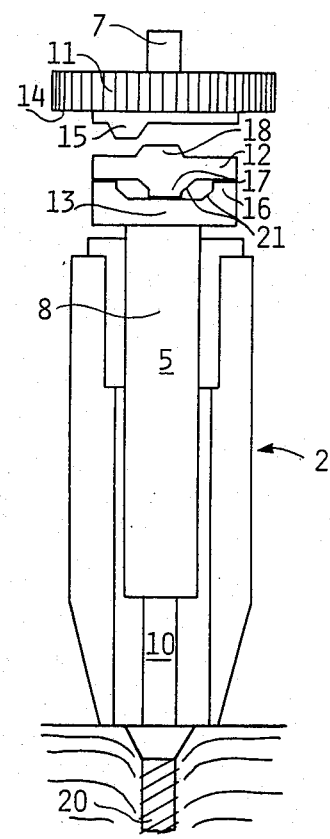
FIG. 2c  FIG. 2d

CLUTCH FOR POWER SCREWDRIVERS

BACKGROUND OF THE INVENTION

The present invention relates to a clutch for power screwdrivers with a transmission, an adjustable bit stop, and a drive shaft and with a cogwheel with cams on one face and a clutch disk with catches on one face mounted on the drive shaft.

Clutches of this type are known. German OS No. 2 427 713 for example describes a clutch for a power screwdriver. Once a limiting torque that can be set by adjusting the force of a compression spring has been attained, the clutch disengages. The screw is then tight. In practice, however, the blade of the screwdriver continues to act on the head of the screw for a while upon termination of the driving process before the operator can lift the tool. Since the pressure on the screw forces the catches on the clutch to remain engaged as long as the blade is in contact with the head of the screw, the edges of the catches collide, producing a noise that is annoying to the operator and subjecting the edges to excess wear.

SUMMARY OF THE INVENTION

The object of the present invention is to provide a low-noise, wear-resistant clutch in which, once the limiting torque has been attained, the clutch catches will not "chatter."

This object is attained in accordance with the invention in a power screwdriver of the aforesaid type, wherein the drive shaft is in one piece, wherein an intermediate disk with catches on one face and cams on the other face is positioned between the cogwheel and the clutch disk, and wherein a spring mechanism is positioned between the cogwheel and the intermediate disk.

Thus the clutch is divided into an overload zone that is activated by a non-interlocking connection when a limiting torque is attained and a slave zone that transmits the screwdriving motion by means of an interlocking connection.

Once the limiting torque has been attained, the engagement surfaces of the cams on the intermediate disk slide over the engagement surfaces of cams on the cogwheel, and the spring mechanism forces the intermediate disk against the clutch disk. The offset shape of the catches and the force of the spring mechanism ensure that, once the two halves of the overload clutch have been initially released, the cams will no longer engage, even when the tool is still resting against the head of the screw.

Another advantage is that the power screwdriver is cheaper to manufacture than conventional power screwdrivers because the drive shaft is in one piece and only one spring mechanism is necessary to disengage the overload zone.

In one embodiment of the invention the engagement surfaces of the catches on the first clutch pair are at a right angle to the faces of the disks, and the transition between the engagement surface and the face of the disks is a slope oriented at an angle to the face.

In one variant of this embodiment, the angle of the transition between the faces of the disk and the engagement surface of the catches to the face is approximately 30°.

The mutually contacting surfaces of the cams on the second clutch pair in this embodiment can slope at an angle of approximately 60° to the axis.

The angles and engagement surfaces can be precisely matched to ensure optimal, low-noise, and wear-resistant operation.

The shapes of the clutch disk catch means and intermediate disk catch means can be identical.

This characteristic also makes the clutch more economical to manufacture.

Preferred embodiments of the invention will hereinafter be described with reference to the appended drawings. It is to be understood, however, that this is merely by way of example and that the scope of the protection sought for the invention is defined exclusively in the claims.

BRIEF DESCRIPTION OF THE DRAWINGS

FIG. 1 is a simplified illustration of a power screwdriver with the drive mechanism left out and FIGS. 2a–d is a schematic illustration of the clutch in various positions.

DESCRIPTION OF THE PREFERRED EMBODIMENTS

Figure 1:
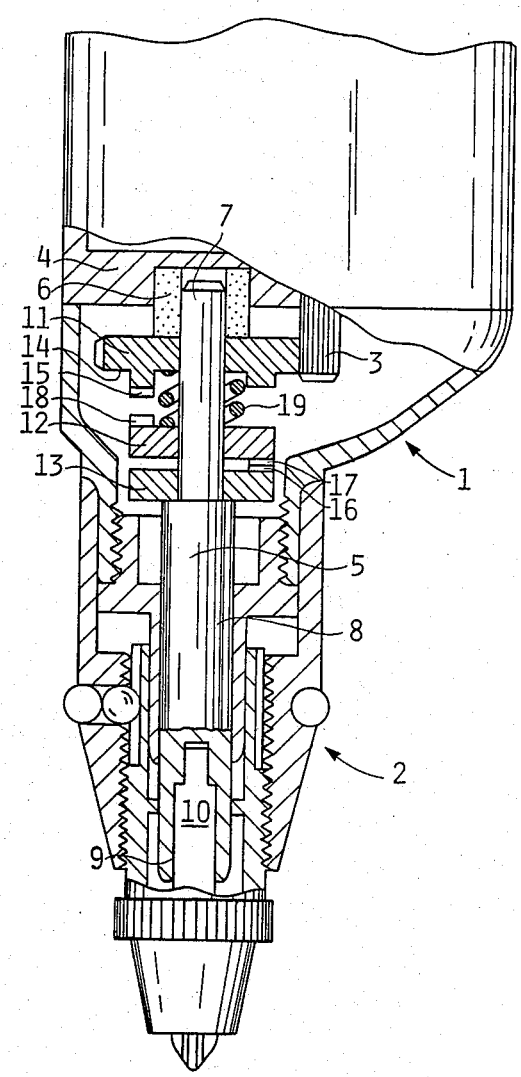

The power screwdriver illustrated in FIG. 1 has essentially a motor, not illustrated, a transmission 1, and a bit stop 2. A pinion 3 on the motor extends into a transmission housing 4. A drive shaft 5 is positioned in housing 4 parallel to pinion 3. One end of drive shaft 5 is mounted in housing 4 in such a way that it can rotate in a bearing 6 and the other end positioned inside bit stop 2. One section 7 of drive shaft 5, in the vicinity of housing 4, has a shorter diameter than the other section 8. On the face of section 8 is an accommodation 9 for a tool 10, a screwdriver blade for instance.

A cogwheel 11 rests against bearing 6 at section 7 of drive shaft 5. Cogwheel 11 can both rotate around and slide along section 7. Their is an annular cam 15 on the face 14 of cogwheel 11 that is remote from bearing 6. A clutch disk 13 is also mounted on section 7 but can neither rotate around or slide along it. There are catches 16 on the face of clutch disk 13 toward cogwheel 11. Between clutch disk 13 and cogwheel 11 is an intermediate disk 12. Intermediate disk 12 can both rotate around and slide along section 7. Intermediate disk 12 has catches 17 or cams 18 on each face that can match the catches 16 and annular cam 15 on clutch disk 13 and cogwheel 11. Between cogwheel 11 and intermediate disk 12 in section 7 is a compression spring 19.

FIG. 2a illustrates the power screwdriver and clutch at a stage when the tool is first applied to the head of a screw 20. The pressure on drive shaft 5 forces clutch disk 13 and intermediate disk 12 to compress spring 19, with cams 15 and 18 engaging. The rotation of cogwheel 11 is accordingly transmitted to drive shaft 5 through intermediate disk 12 and clutch disk 13. As the rotation becomes established, the sides of the catches slide onto slopes 21 and lock together. The screw is driven in as illustrated in FIG. 2b.

In FIG. 2c, the torque that is applied to drive the screw in has become so high that the sides of cams 15 and 18 slide together and intermediate disk 12 moves, augmented by compression spring 19, away from cogwheel 11.

FIG. 2d shows the clutch once the desired screw insertion has been attained. Cams 15 and 18 are disengaged and, since compression spring 19 retains intermediate disk 12 in that position, the catches cannot meet. Compression spring 19 forces the catches 17 on intermediate disk 12 over slopes 21 against the face of clutch disk 13.

The components of the clutch can only operate in conjunction as illustrated in FIG. 2 when the cams and catches are appropriately shaped in relation to one another. The catches 16 and 17 in one in pair are shaped to ensure that intermediate disk 12 will move away from clutch disk 13 over a slope 21 at an angle $\alpha$ of approximately 30° when the torque is initially transmitted. The catches will accordingly join in an interlocking connection as they slide over the area of the side that parallels the axis. Cam pair 15 and 18 provides for uncoupling when a limiting torque has been attained. It has turned out that the results will be most desirable if the sides are at an angle $\beta$ of 60° to the axis.

It is of course also possible to reverse the design of the clutch, interchanging the positions of the zone of interlocking rotation transmission and the zone of non-interlocking overload coupling, and retain all the advantages of the clutch just described.

The invention has been described herein with reference to exemplary embodiments. It will be understood, however, that it is receptable of various modifications, which will offer themselves to those skilled in the art and which are intended to be encompassed within the protection sought for the invention as set forth in the appended claims.

We claim:

1. A clutch for power screwdrivers with a transmission, comprising: a one-piece drive shaft; a gear rotatable about said shaft; a clutch disk mounted on said shaft; an intermediate disk rotatable about said shaft and positioned between said gear and said clutch disk; said intermediate disk having two faces; catch means on one face of said intermediate disk; cam means on the other face of said intermediate disk; cam means on a face of said gear for engaging said cam means on said other face of said intermediate disk; catch means on a face said clutch disk for engaging said catch means on said one face of said intermediate disk; and spring means positioned between said gear and said intermediate disk.

2. A clutch as defined in claim 1, wherein both said catch means have engagement surfaces located at right angles to said one face of said intermediate disk and said face of said clutch disk, a transition surface between an engagement surface and respective disk face having a slope oriented at a predetermined angle to said respective disk face.

3. A clutch as defined in claim 2, wherein said predetermined angle of said slope is substantially 30°.

4. A clutch as defined in claim 1, wherein both said cam means have mutually contacting surfaces sloping at an angle of substantially 60°, with respect to said face of said cam means.

5. A clutch as defined in claim 1, wherein said clutch disk catch means and said intermediate disk catch means have identical shapes.

* * * * *